No. 876,099. PATENTED JAN. 7, 1908.
F. M. SCHMIDT.
COMBINED WAISTBAND AND FLY FRONT.
APPLICATION FILED MAY 22, 1907.
2 SHEETS—SHEET 1.
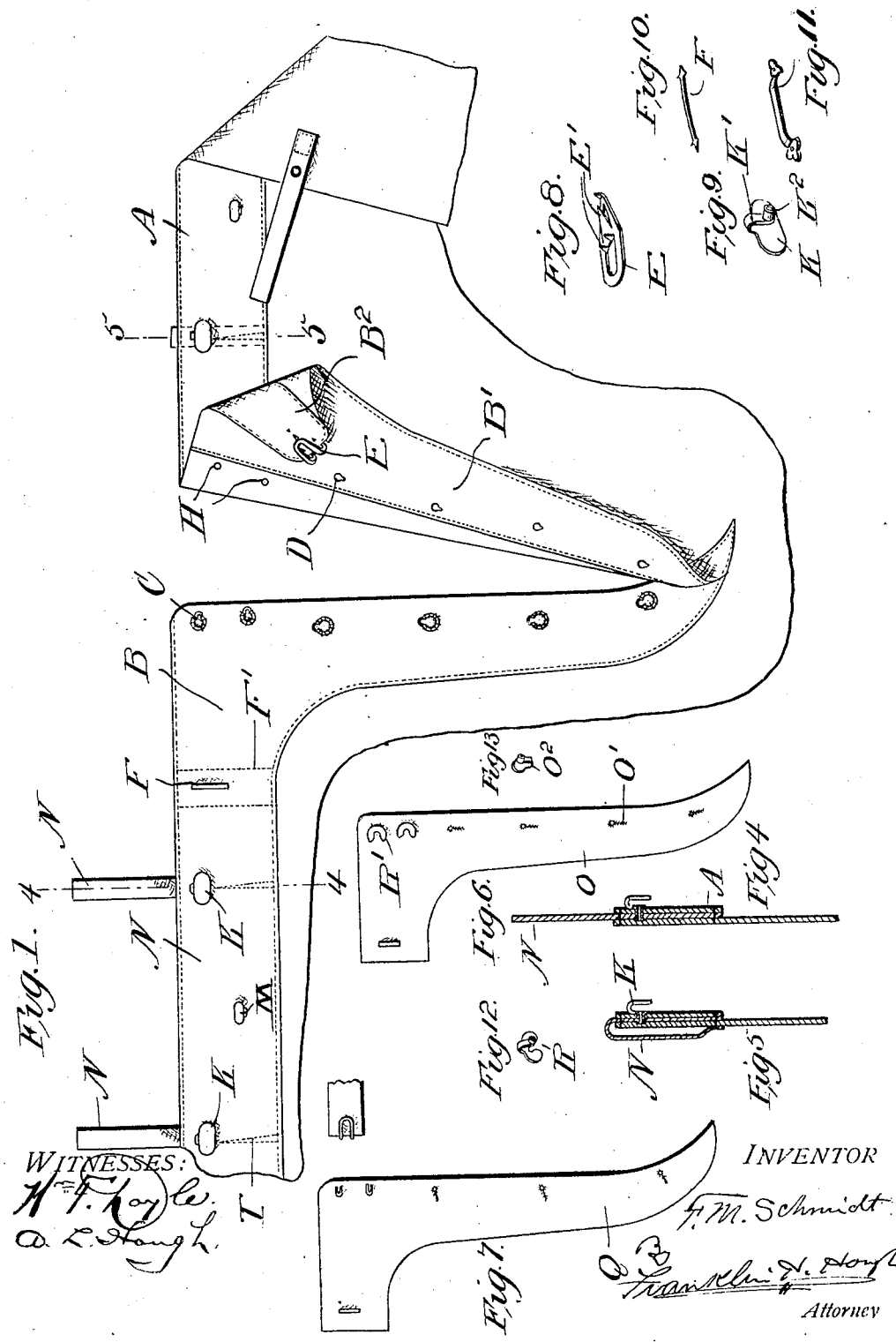
WITNESSES:
INVENTOR
F. M. Schmidt
Attorney No. 876,099.
PATENTED JAN. 7, 1908.
F. M. SCHMIDT.
COMBINED WAISTBAND AND FLY FRONT.
APPLICATION FILED MAY 22, 1907.
2 SHEETS—SHEET 2.
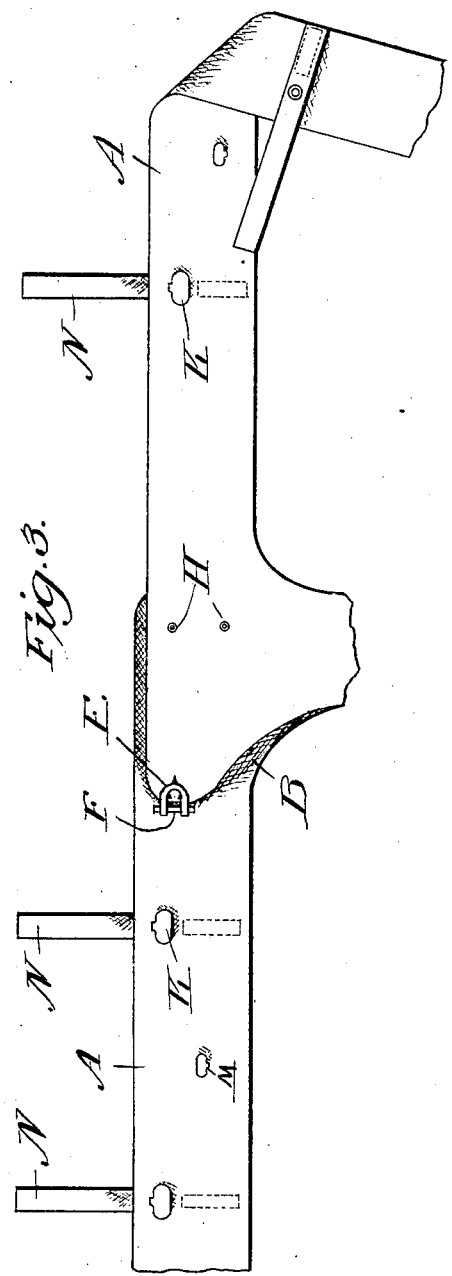
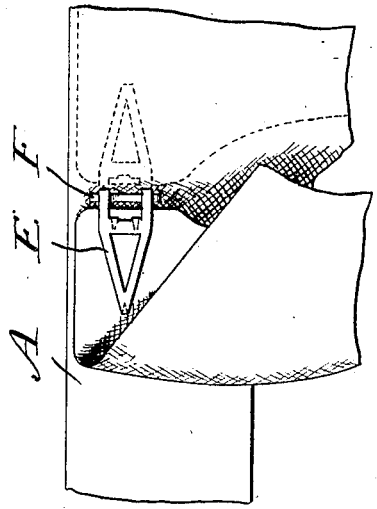
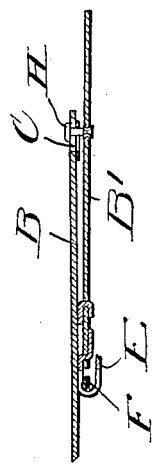
WITNESSES:
INVENTOR
BY
Attorney

UNITED STATES PATENT OFFICE.

FRANK M. SCHMIDT, OF JACKSONVILLE, FLORIDA.

COMBINED WAISTBAND AND FLY-FRONT.

No. 876,099.  Specification of Letters Patent.  Patented Jan. 7, 1908.

Application filed May 22, 1907. Serial No. 375,147.

*To all whom it may concern:*

Be it known that I, FRANK M. SCHMIDT, a citizen of the United States, residing at Jacksonville, in the county of Duval and State of Florida, have invented certain new and useful Improvements in a Combined Waistband and Fly-Front; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in combined fly fronts and waistbands to which suspender engaging hooks and belt straps are fastened, and the object of the invention is to produce a device of this nature as an article of manufacture to tailors or manufacturers, and adapted to be stitched to the material out of which the trousers are to be made, thus making it possible to expedite greatly the manufacture of trousers by having the completed strips in readiness to be adjusted in place.

My invention comprises various other details of construction and combinations and arrangements of parts which will be hereinafter fully described and then specifically defined in the appended claims.

I illustrate my invention in the accompanying drawings, in which:—

Figure 1 is a side elevation of a completed combined fly and waistband with the suspender hooks and belt straps fastened thereto and in readiness to be applied to the trousers. Fig. 2 is an elevation illustrating the first step in connecting the ends of the flies together, said view showing in dotted line the fly turned back with the hook in a reverse position to that shown in solid lines. Fig. 3 is a side elevation showing the flies fastened together. Fig. 3ª is a sectional view through the flies and locking means shown in Fig. 3. Fig. 4 is a sectional view on line 4—4 of Fig. 1. Fig. 5 is a sectional view on line 5—5 of Fig. 1. Fig. 6 is a detailed view of a separate fly. Fig. 7 is a view of a slightly modified form of a separate fly. Fig. 8 is a detailed view of a plate which is bent to form a hook. Fig. 9 is a detailed view of a suspender hook. Fig. 10 is a detailed view of a bar to be engaged by a hook upon the fly. Fig. 11 is a detailed view of a bar for engagement with the hook upon the fly. Fig. 12 is a detailed view of a modified form of hook carried by the fly, and Fig. 13 is a detailed view of a fastener which may be employed upon the fly.

Reference now being had to the details of the drawings by letter, A designates a waist band, made preferably of two strips of material having selvage edges, and B and B' designate the two front flies which are integral with or fastened to said waist band, as may be desired. One of the flies B is provided with socket members C having slots therein with contracted portions adapted to receive the fasteners D, which are secured to the fly B' and have heads of shapes corresponding to the shapes of said sockets which they are adapted to engage.

B² designates an integral tongue upon said fly B' and which has fastened thereto a hook E, a detailed view of which before being bent into hook form is shown in Fig. 8 of the drawings, the shank portion of which hook has integral spurs E' adapted to clench the tongue in the manner shown in Fig. 1 of the drawings.

F designates a bar, a detail of which is shown in Fig. 10 of the drawings, the barbed ends of which pass through slits formed in the fly and upon either side and parallel with said bar is a row of stitching F' adapted to hold the bar in place, which stitching is adapted to pass through the material of which the trousers are made. In fastening the flies, said hook E engages the bar F in the manner shown in Fig. 2 of the drawings after which the tongue B² is turned in the opposite direction, as shown in sectional view in Fig. 3 of the drawings, after which the fasteners H upon the fly B' are made to engage the socket members C to hold the flies securely together.

K—K designate suspender engaging hooks which are used as substitutes for buttons, a detailed view of one of said hooks being shown in Fig. 9 of the drawings. It will be noted that each of said hooks has an elongated head and a contracted shank portion K', which is substantially U-shaped and is provided with an integral eyelet K² which serves as a rivet and adapted to be passed through the waist band A and also a belt forming strap N in the manner shown in Fig. 4 of the drawings. After said eyelet has been passed through the waist band and the belt forming strap, said eyelet is clenched and serves to securely hold the parts together in the manner shown. It will be noted that the strap N, which is to form a belt loop, projects beyond the upper edge of the waist band and, after my combined waist band and fly device is adjusted to the trousers adapted to be stitched thereto, said straps N may be turned down in the manner shown in Fig. 5 of the drawings and its lower end stitched to the trousers forming any length of loop desired. In the event of it not being desired to utilize the belt straps which are made with the combination device in readiness to be applied to the device, the said straps may be cut off near the marginal edge of the waist band. It will be noted that, by fastening the hooks to the waist band and also to the belt straps, said hooks will be reinforced and the usual lining of canvas employed in making waist bands may be dispensed with. It is my purpose to construct these combination waist bands and flies of various sizes and of different colors and material, so that the tailors or manufacturers may order the same for any size of trousers or for any color of goods which may be desired.

In Figs. 6 and 7 of the drawings, I have shown detachable flies, designated by letters O and Q, the former showing the ordinary form of vertically disposed button holes to engage the form of hook $O^2$, shown in Fig. 13, which is adapted to be fastened to a fly B' and, in Fig. 7 of the drawings, I have shown the form of holes as turning at right angles to the length of the fly and adapted to be engaged by an ordinary button, if desired to use the same upon the opposite fly. In Fig. 12 of the drawings is shown a slightly modified form of hook, designated by letter R, which may be substituted if desired for the hooks R', shown in Fig. 6 of the drawings. In order to further reinforce and hold the belt straps, rows of stitching T are made vertically in the waist band, as shown clearly in Fig. 1 of the drawings.

By reference to Fig. 1 of the drawings, it will be seen that the suspender engaging hooks, the bars and the fly holding members are all placed a slight distance in from the marginal edge of the waist band in order that my improved combination waist band and fly may be readily stitched to the trousers without in any way interfering with the said hooks or fastening devices. Intermediate each pair of suspender engaging hooks is a similar hook M, which is held to the waist band by means of an eyelet which clenches the band, said hook M being provided for the purpose of forming means to support drawers.

From the foregoing it will be noted that, by the provision of a combined waist band, fly front with suspender hooks and belt straps, a finished article is afforded which may be offered to manufacturers of trousers and in readiness to be applied to the goods, thus effecting a great saving of time to the manufacturers incident to the assembling of the various parts to make up the fly and waist band attachments.

What I claim is:—

1. As an article of manufacture, a combination waist band and fly front, belt straps, suspender engaging hooks having integral eyelet rivets adapted to pass through the waist band and said straps and, when clenched, designed to hold the parts together, as set forth.

2. As an article of manufacture, a combination waist band and fly front having suspender hooks and belt straps fastened thereto, a bar secured to one of the fly fronts, a hook mounted upon the overlapping fly adapted to engage said bar, socket members upon the bar carrying the fly and fasteners upon the opposite fly adapted to engage said socket members, as set forth.

In testimony whereof I hereunto affix my signature in the presence of two witnesses.

FRANK M. SCHMIDT.

Witnesses:
A. L. HOUGH,
FRANKLIN H. HOUGH.